United States Patent
Eberspach et al.

(10) Patent No.: US 10,358,013 B2
(45) Date of Patent: Jul. 23, 2019

(54) VEHICLE WITH FUEL LINE COOLING

(71) Applicant: Eberspächer Climate Control Systems GmbH & Co. KG, Esslingen (DE)

(72) Inventors: Günter Eberspach, Wolfschlugen (DE); Hans Jensen, Dettingen unter Teck (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 0 days.

(21) Appl. No.: 15/829,120

(22) Filed: Dec. 1, 2017

(65) Prior Publication Data

US 2018/0154733 A1 Jun. 7, 2018

(30) Foreign Application Priority Data

Dec. 2, 2016 (DE) .................. 10 2016 123 323

(51) Int. Cl.
| | | |
|---|---|---|
| *F02M 37/00* | (2006.01) | |
| *B60H 1/00* | (2006.01) | |
| *F02M 31/20* | (2006.01) | |
| *B60K 15/01* | (2006.01) | |
| *B60H 1/22* | (2006.01) | |
| *B60K 15/03* | (2006.01) | |

(52) U.S. Cl.
CPC ......... *B60H 1/00271* (2013.01); *B60K 15/01* (2013.01); *F02M 31/20* (2013.01); *F02M 37/0047* (2013.01); *B60H 2001/2284* (2013.01); *B60K 2015/03414* (2013.01); *B60Y 2306/05* (2013.01); *Y02T 10/126* (2013.01)

(58) Field of Classification Search
CPC .... F02M 37/0047; F02M 37/00; F02M 31/20; F01P 1/06; B60H 1/00271; B60H 2001/2284; B60K 15/01; B60K 2015/03414; B60Y 2306/05
See application file for complete search history.

(56) References Cited

U.S. PATENT DOCUMENTS

| | | | | |
|---|---|---|---|---|
| 4,924,838 | A * | 5/1990 | McCandless | ........... F02B 37/00 123/514 |
| 5,251,603 | A | 10/1993 | Watanabe et al. | |
| 6,250,328 | B1 * | 6/2001 | Distelhoff | .............. F02M 31/20 123/41.31 |

(Continued)

FOREIGN PATENT DOCUMENTS

| | | |
|---|---|---|
| DE | 101 25 588 C1 | 6/2002 |
| DE | 10 2007 001 382 B4 | 1/2009 |

(Continued)

OTHER PUBLICATIONS

Machine translation of Detailed Description; DE10125588C1; Dedio, Horst; publ'n date Jun. 6, 2006; obtained Jul. 31, 2018, from https://worldwide.espacenet.com/; pp. 1-6.*

*Primary Examiner* — Grant Moubry
(74) *Attorney, Agent, or Firm* — McGlew and Tuttle, P.C.

(57) ABSTRACT

A vehicle includes a drive motor arranged in an engine compartment, a fuel-operated vehicle heater arranged in the engine compartment, a fuel tank, a fuel line (22) leading from the fuel tank to the vehicle heater, as well as a cooling air line arrangement (46). The cooling air line arrangement (46) envelops the fuel line (22) in at least some areas for providing a cooling air flow duct (50) for cooling air flowing around the fuel line (22).

16 Claims, 2 Drawing Sheets

(56) References Cited

U.S. PATENT DOCUMENTS

2012/0325181 A1* 12/2012 Burke ................ F02B 29/0443
                                                                                            123/540

FOREIGN PATENT DOCUMENTS

| | | |
|---|---|---|
| DE | 11 2009 000 781 T5 | 3/2011 |
| EP | 0 807 756 A2 | 11/1997 |
| EP | 0826874 A2 * | 3/1998 ............ F02M 31/20 |
| EP | 1 045 131 A2 | 10/2000 |
| JP | S5453124 U | 4/1979 |
| JP | S63-154416 A | 6/1988 |

* cited by examiner

VEHICLE WITH FUEL LINE COOLING

CROSS REFERENCE TO RELATED APPLICATIONS

This application claims the benefit of priority under 35 U.S.C. § 119 of German Application 10 2016 123 323.4, filed Dec. 2, 2016, the entire contents of which are incorporated herein by reference.

FIELD OF THE INVENTION

The present invention pertains to a vehicle, which comprises a drive motor arranged in an engine compartment as well as a fuel-operated vehicle heater likewise arranged in the engine compartment. Furthermore, a fuel tank, to which the vehicle heater is connected via a fuel line, is provided at the vehicle to supply the vehicle heater with fuel. If the motor is an internal combustion engine, it may also be fed from the fuel tank.

BACKGROUND OF THE INVENTION

In case of such vehicles, it may be required to also operate the vehicle heater when the drive motor and thus also the engine compartment is heated by a prior operation of the drive motor, especially when these vehicles are configured as so-called plug-in hybrids. Since the fuel line leading to the vehicle heater extends in at least some areas in the engine compartment and thus also comparatively close to the drive motor because of the positioning of the vehicle heater in the engine compartment, there is the risk in this state that the fuel generally flowing almost pressurelessly through the fuel line evaporates or forms bubbles. If such bubbles reach the combustion chamber during the combustion operation, this can lead to a flame-out or to a compromise of the combustion characteristics and thus to an increased emission of harmful substances.

SUMMARY OF THE INVENTION

An object of the present invention is to provide a vehicle with a fuel-operated vehicle heater which operates largely uncompromised by the thermal conditions prevailing in the area of the vehicle.

According to the present invention, this object is accomplished by a vehicle, comprising—a drive motor arranged in an engine compartment,—a fuel-operated vehicle heater arranged in the engine compartment,—a fuel tank,—a fuel line leading from the fuel tank to the vehicle heater, and—a cooling air line arrangement enveloping the fuel line in at least some areas for providing a cooling air flow duct for cooling air flowing around the fuel line.

Due to the cooling air line arrangement provided according to the present invention, which envelops the fuel line in at least some areas, the fuel line is shielded not only from the outside and, for example, from a comparatively hot surrounding area and is thus protected against heating, but it also becomes possible to eliminate heat from the area of the fuel line by provision of a cooling air flow flowing about the fuel line and thus to prevent an excessive heating of the fuel line.

According to an advantageous aspect of the present invention, this effect can be utilized especially efficiently when the cooling air line arrangement envelops the fuel line at least in one area of its length section extending in the area of the engine compartment.

In order to induce a cooling air flow through the cooling air flow duct solely based on the pressure conditions prevailing at a vehicle especially in drive mode without providing units generating the flow of cooling air, it is proposed that an inlet opening area of the cooling air line arrangement be positioned in a vehicle longitudinal direction in front of an outlet opening area of the cooling air line arrangement, i.e., be positioned closer to a vehicle front end area than the outflow opening area. In particular, provisions may be made according to the present invention for an inlet opening area of the cooling air line arrangement to be arranged in an area of higher air pressure at the vehicle, and for an outlet opening area of the cooling air line arrangement to be arranged in an area of lower air pressure at the vehicle.

In drive mode of a vehicle, an elevated air pressure forms in the vehicle front end area because of the dynamic pressure. Hence, for the efficient utilization of the air pressure conditions forming at a vehicle in drive mode to force an air flow in the cooling air flow duct, it is proposed that the inlet opening area of the cooling air line arrangement be arranged close to a vehicle front end area or/and open in the direction towards the vehicle front end area.

Equally, because of the flow around a moving vehicle, the air pressure in the area of an underbody and in the area of a vehicle rear area will be lower than especially in the area of the vehicle front end area. In order to be also able to utilize this effect, it is further provided that the outlet opening area of the cooling air line arrangement may be arranged open in the area of an underbody or/and in a vehicle rear area or/and in the direction towards the underbody or/and in a vehicle rear end area.

A blower is generally provided at a vehicle in order to generate a flow around a cooler to cool the coolant flowing through the internal combustion engine and to heat the air to be admitted into the vehicle interior. In order to be able to utilize such a vehicle blower also to force a flow through the cooling air flow duct, it is further proposed that an outlet opening area of the cooling air line arrangement be in flow connection with an intake side of a vehicle blower, or/and that an inlet opening area of the cooling air line arrangement be in flow connection with a delivery side of a vehicle blower.

In an alternative configuration, provisions may be made for an outlet opening area of the cooling air line arrangement to be in connection with a combustion air inlet area of the vehicle heater. Combustion air to be burned together with the fuel is taken in at the combustion air inlet area of the vehicle heater. This intake effect can be utilized to deliver cooling air through the cooling air line arrangement and to use this air leaving the cooling air line arrangement at the outlet opening area as combustion air.

To adapt the cooling air line arrangement to the configuration of the fuel line generally comprising a plurality of curvature areas, it is proposed that the cooling line arrangement comprise a flexible tube.

The effect according to the present invention of a preferably passive cooling of a fuel line can be especially efficiently utilized when the engine compartment is arranged in a front area of the vehicle or/and the fuel tank is arranged in a rear area of the vehicle.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
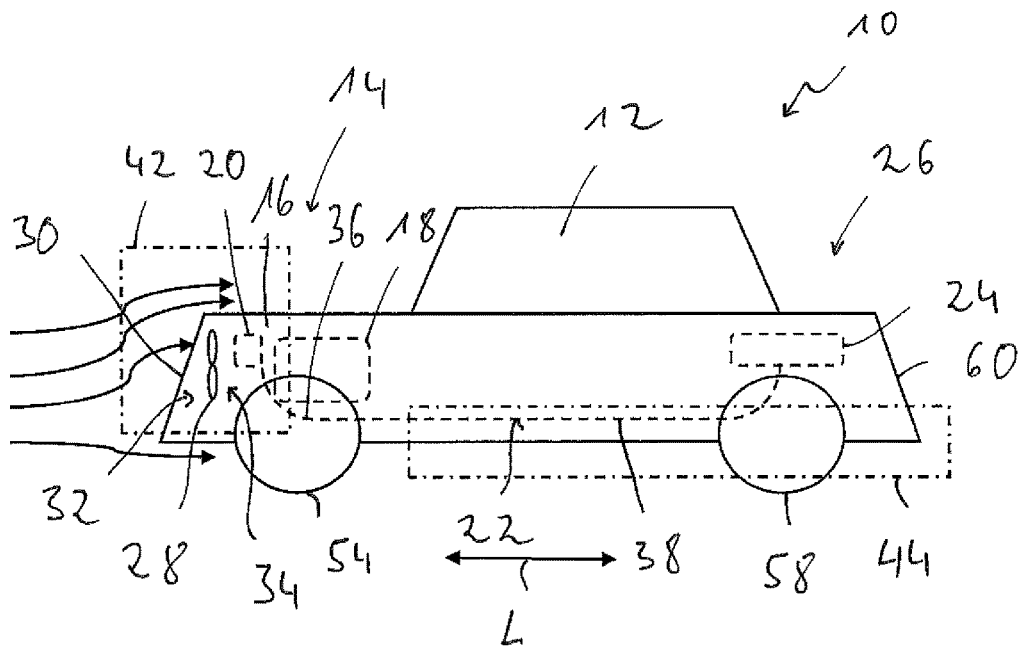
FIG. 1 is a schematic diagram of a vehicle according to the invention.

Referring to the drawings, a vehicle is generally designated by 10 in FIG. 1. The vehicle 10, which is extended in a vehicle longitudinal direction L and can generally be moved forwards and backwards also in this vehicle longitudinal direction L, has an engine compartment 16 in a vehicle front area 14 located in front of the passenger compartment 12 in the vehicle longitudinal direction L, in relation to the forwards direction of travel. A drive motor 18, for example, an internal combustion engine, is arranged in the engine compartment 16. Furthermore, a fuel-operated vehicle heater 20 is arranged in the engine compartment 16. This fuel-operated vehicle heater 20 is fed with fuel drawn from a fuel tank 24 via a fuel line 22. The fuel tank 24 is arranged essentially behind the passenger compartment 12, i.e., in a vehicle rear area 26 in the vehicle longitudinal direction L, in relation to the forwards direction of travel, in the configuration of the vehicle 10 shown in FIG. 1.

Further, a vehicle blower 28, which is shown schematically and which delivers air through a cooler, not shown, to cool coolant of the drive motor 18, is provided in the engine compartment 16. The vehicle blower 28 is preferably arranged essentially directly at a vehicle front end area 30, so that the air to flow to the vehicle front end area 30 of the vehicle 10 flows in drive mode on its intake side 32. On its delivery side, the vehicle blower 28 discharges the air delivered by this vehicle blower 28 in the direction towards the already mentioned cooler under high pressure.

The fuel line 22 connecting the vehicle heater 20 to the fuel tank 24 extends with a length section 36 of same in the engine compartment 16 and thus generally comparatively close to the drive motor 18. In a length section 38 following in the direction towards the fuel tank 24, the fuel line 22 is guided under the passenger compartment 12 to an underbody 40 or along the underbody 40 in the direction towards the fuel tank 24.

The fuel line 22 thus extends in the vehicle 10 especially with its length section 36 connecting to the vehicle heater 20 in at least some areas in an area 42 of higher air pressure, and especially extends with its length section 38 extending along the underbody 40 or in the vehicle rear area 26 in an area 44 of lower air pressure. These areas 42, 44 of different air pressures form in drive mode of the vehicle 10 because of the dynamic pressure forming at the vehicle front end area 30 and because of the flow around of the vehicle 10 from its vehicle front area 14 to its vehicle rear area 26. During this flow around, a vacuum or lower air pressure forms because of the approximately airfoil section-like contour of the vehicle 10 in the area of the air flow guided along the underbody 40 in relation to the air flow guided along the top side or the passenger compartment 12 and in relation to the dynamic pressure forming at the vehicle front end area 30.

The present invention utilizes these air pressure conditions developing in drive mode of the vehicle 10 to cool the fuel line 22 in at least some areas by cooling air flowing around, as will be explained in detail below, and thus to protect against excessive heating especially in its length section 36 extending in the engine compartment 16.

Figure 2:
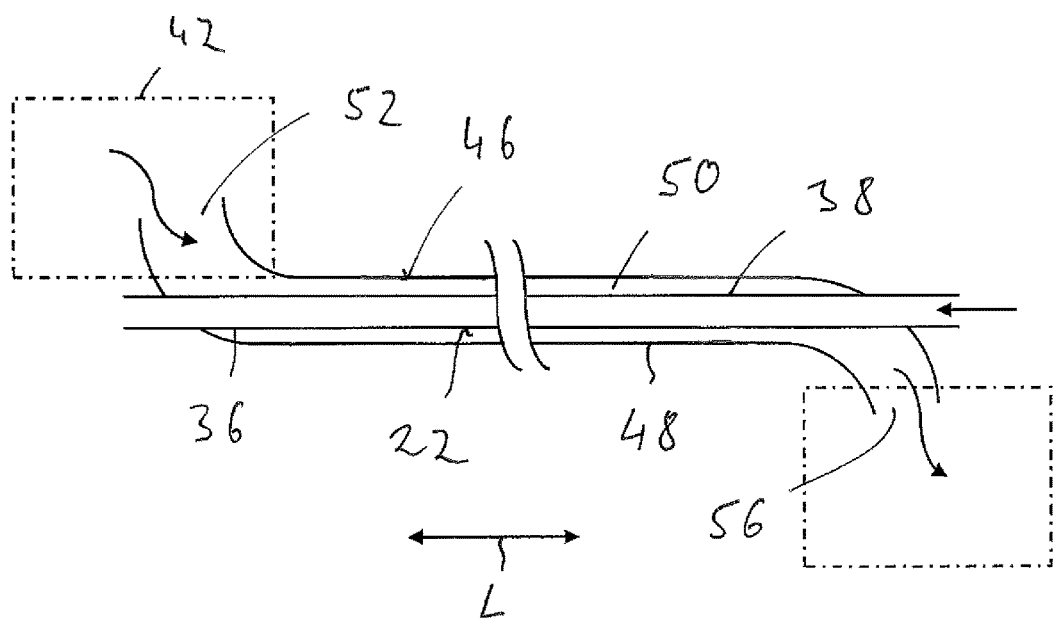
FIG. 2 is a schematic diagram of a fuel line enveloped in some areas by a cooling air line arrangement.

FIG. 2 shows a schematic diagram of the fuel line 22 with its length sections 36, 38. In association with the fuel line 22, a cooling air line arrangement 46, enveloping this fuel line 22, is provided in at least some areas. This cooling air line arrangement may comprise a flexible tube 48, in which a cooling air flow duct 50 is formed to cause cooling air to flow around with the fuel line 22. The cooling air line arrangement 46 is arranged such that it is positioned with an inlet opening area 52 in the area 42 of higher pressure, so that in this area 42 of higher pressure air can enter the cooling air flow duct 50. This inlet opening area 52 is preferably positioned such that it is positioned in the vehicle 10 close to or directly behind the vehicle front end area 30, and is especially positioned in front of front wheels 54 of the vehicle 10. As an alternative or in addition, it is possible to position the inlet opening area 52 on the delivery side 34 of the vehicle blower 28, so that a part of the air delivered by the vehicle blower 28 enters the cooling air flow duct 50, preferably before this air has flowed through the cooler, not shown. For example, the cooling air line arrangement 46 may be connected with its inlet opening area 52 to a blower housing of the vehicle blower 28 in the area of the delivery side 34.

An outlet opening area 56 of the cooling air line arrangement 46 is positioned at the vehicle such that the cooling air flow duct 50 is open towards the area 44 of lower air pressure in this area. This outlet opening area 56 may thus be positioned in the area of the underbody 40 preferably between the front wheels 54 and rear wheels 58 and be open in the direction towards the underbody 40 or in the direction towards a vehicle rear end area 60. In an alternative configuration, the outlet opening area 56 may, for example, by in connection with the intake side 32 of the vehicle blower 28 via a line connection, not shown, for example, be connected to a blower housing in the area of the intake side 32.

By positioning the inlet opening area 52, on the one hand, and the outlet opening area 56, on the other hand, in areas with different air pressure levels, an air flow is forced through the cooling air flow duct 50. Since this air flow is formed by comparatively cold air, reaching the area of the vehicle 10 during the flow into the vehicle front end area 30, heat can be efficiently removed from the area of the fuel line 22, so that especially in that length section 36, in which the fuel line 22 can take up heat from the engine compartment 16 or from the engine 18, an excessive heating of the fuel line 22 and thus the evaporation of the fuel in the interior of the fuel line 22 can be avoided. Even when such a difference in pressure generating flow around or flow into the vehicle 10 is not present when the vehicle 10 is idle, such a flow can be forced through the cooling air flow duct 50, for example, by utilizing the delivery action of the vehicle blower 28. If this is not possible because of structural parameters, then the fuel line 22 is shielded at least from the outside especially in its length section 36 extending in the engine compartment 16 and is protected against heating due to heat radiation or/and heat convection.

Figure 3:
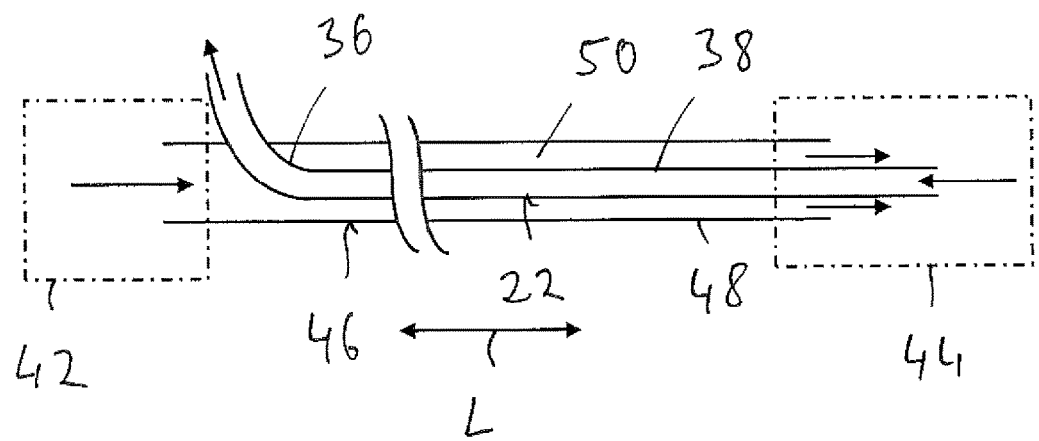
FIG. 3 is a view of an alternative configuration corresponding to FIG. 2.

FIG. 3 shows an alternative configuration of the interaction of the fuel line 22 with the cooling air line arrangement 46. In the exemplary embodiment schematically shown in FIG. 3, it can be clearly seen that the cooling air line arrangement 46 is open in its inlet opening area 52 essentially in the direction of the vehicle longitudinal direction L to the area 42 of higher air pressure, for example, directly behind the vehicle front end area 30 or in the area of the delivery side 34 of the vehicle blower 28. In the area of its outlet opening area 56, the cooling air line arrangement 46 is likewise open essentially in the direction of the vehicle longitudinal direction L or oriented in the direction towards the vehicle rear end area 60. It is obvious that the different configurations of the cooling air line arrangement 46 shown in FIGS. 2 and 3 may be combined with one another as desired in their inlet opening area 52 and their outlet opening area 56.

In order to provide a defined distance of the flexible tube 48 to the fuel line 22 in case of the cooling air line arrangement 46 described above, it is, for example, possible to provide spacer elements in different length areas, which spacer elements preset a defined positioning of the tube 48 in relation to the fuel line 22, on the one hand, and essentially do not obstruct the flow of cooling air through the cooling air flow duct 50, and have, for example, a plurality of flow openings for this, on the other hand.

Figure 4:
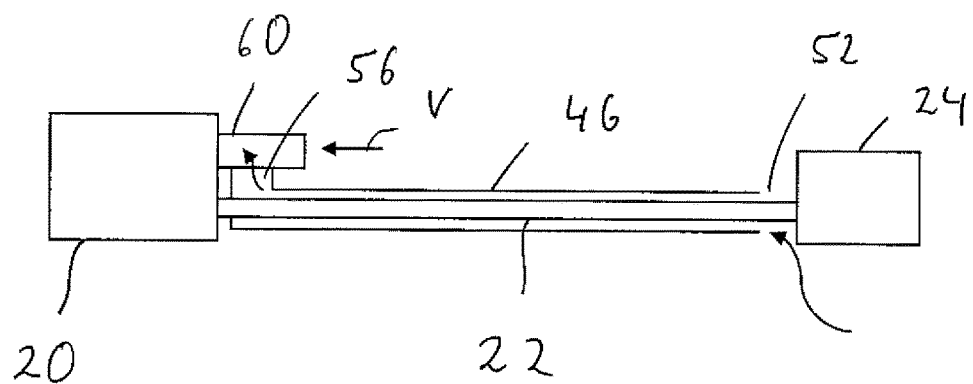
FIG. 4 is a view belonging to another alternative configuration.

FIG. 4 shows another alternative configuration. The cooling air line arrangement 46 is positioned with its inlet opening area 52, for example, close to the fuel tank 24. The outlet opening area 56 is connected to a combustion air inlet area of the vehicle heater 20, which combustion air inlet area is generally designated by 60. Combustion air V to be burned together with the fuel drawn from the fuel tank 24 is taken in by means of a combustion air blower, for example, a side channel blower, into the vehicle heater 20 via the combustion air inlet area 60, which is configured, for example, as an intake pipe. This means, in principle, that a vacuum prevails at the combustion air inlet area 60, which vacuum is utilized in this embodiment to take in air through the cooling air line arrangement 46 and to deliver this air taken in through the cooling air line arrangement 46 into the vehicle heater 20 and to utilize it to burn with fuel. In this connection, the air taken in through the cooling air line arrangement 46 can provide some of the air needed for the combustion, which air together with combustion air V to be taken in from outside is utilized for mixing and burning with the fuel. As an alternative, all the air needed for combustion could also be taken in through the cooling air line arrangement 46 and be guided via the combustion air inlet area 60 into the vehicle heater 20.

The principles of the present invention may be utilized especially efficiently when the engine compartment containing the drive motor and the vehicle heater is arranged in the front area of the vehicle. Nevertheless, it should be noted that the present invention can also be used in a vehicle, in which the engine compartment and thus the drive motor as well as the vehicle heater are arranged in the rear area, i.e., behind the passenger compartment.

While specific embodiments of the invention have been shown and described in detail to illustrate the application of the principles of the invention, it will be understood that the invention may be embodied otherwise without departing from such principles.

What is claimed is:

1. A vehicle comprising:
   a drive motor arranged in an engine compartment, the engine compartment being arranged in a front area of a vehicle;
   a fuel-operated vehicle heater arranged in the engine compartment;
   a fuel tank arranged in a rear area of the vehicle;
   a fuel line leading from the fuel tank to the vehicle heater; and
   a cooling air line arrangement enveloping the fuel line in at least some areas of the fuel line, the cooling air line arrangement comprising a cooling air flow duct guiding cooling air to flow around the fuel line, the cooling air line arrangement comprising an inlet opening area arranged in an area of higher air pressure at the vehicle close to a vehicle front end area or open in a direction towards the vehicle front end area, the cooling air line arrangement comprising an outlet opening area arranged in an area of lower air pressure at the vehicle such as to be open in an area of an underbody or in a direction towards the underbody or to be open in a vehicle rear end area.

2. The vehicle in accordance with claim 1, wherein the cooling air line arrangement envelops the fuel line at least in one area of a length section extending in an area of the engine compartment.

3. The vehicle in accordance with claim 1, wherein the cooling air line arrangement comprises a flexible tube forming at least a part of the cooling air flow duct.

4. The vehicle in accordance with claim 1, wherein the cooling air flows in a direction opposite a traveling direction of the vehicle.

5. The vehicle in accordance with claim 1, wherein the cooling air flows in a direction of the vehicle rear end area.

6. The vehicle in accordance with claim 1, wherein a cooling air flow path extends in a direction away from the vehicle front end area toward the vehicle rear end area, the cooling air flowing along the cooling air flow path.

7. A vehicle comprising:
   a vehicle structure comprising an underbody, a front area and a rear area;
   an engine compartment arranged in the front area;
   a drive motor arranged in the engine compartment;
   a fuel-operated vehicle heater arranged in the engine compartment;
   a fuel tank arranged in the rear area;
   a fuel line extending from the fuel tank to the vehicle heater; and
   a cooling air line arrangement surrounding at least some areas of the fuel line, the cooling air line arrangement comprising a cooling air flow duct surrounding the at least some areas of the fuel line, the cooling air flow duct guiding cooling air to flow around the fuel line, the cooling air line arrangement comprising an inlet opening area arranged in an area of higher air pressure at the vehicle structure adjacent to the front area or open in a direction towards the front area, the cooling air line arrangement comprising an outlet opening area arranged in an area of lower air pressure at the vehicle structure, the outlet being one of open in an area of the underbody, open in a direction towards the underbody and open in the rear area.

8. The vehicle in accordance with claim 7, wherein the cooling air line arrangement surrounds the fuel line at least in one area of a length section extending in an area of the engine compartment.

9. The vehicle in accordance with claim 7, wherein the cooling air line arrangement comprises a flexible tube forming at least a part of the cooling air flow duct.

10. The vehicle in accordance with claim 7, wherein the cooling air flows in a direction opposite a traveling direction of the vehicle structure.

11. The vehicle in accordance with claim 7, wherein the cooling air flows in a direction of the rear area.

12. The vehicle in accordance with claim 7, wherein a cooling air flow path extends in a direction away from the front area toward the rear area, the cooling air flowing along the cooling air flow path.

13. A vehicle comprising:
- a vehicle structure comprising a front area and a rear area;
- an engine compartment arranged in the front area;
- a drive motor arranged in the engine compartment;
- a fuel-operated vehicle heater arranged in the engine compartment;
- a fuel tank arranged in the rear area;
- a fuel line extending from the fuel tank to the vehicle heater; and
- a cooling fluid line arrangement surrounding at least some areas of the fuel line, the cooling fluid line arrangement comprising a cooling fluid flow duct surrounding the at least some areas of the fuel line, the cooling fluid line arrangement comprising an inlet opening area arranged in an area of higher fluid pressure at the vehicle structure adjacent to the front area or open in a direction towards the front area, the cooling fluid line arrangement comprising an outlet opening area arranged downstream of the inlet opening area with respect to a flow of cooling fluid in an area of lower fluid pressure at the vehicle structure, the outlet being one of open in an area of the underbody, open in a direction towards the underbody and open in the rear area, the cooling fluid flow duct guiding the cooling fluid to flow around the fuel line such that the cooling fluid flows in a direction away from the front area toward the rear area.

14. The vehicle in accordance with claim 13, wherein the cooling fluid line arrangement surrounds the fuel line at least in one area of a length section extending in an area of the engine compartment.

15. The vehicle in accordance with claim 13, wherein the cooling fluid line arrangement comprises a flexible tube forming at least a part of the cooling fluid flow duct.

16. The vehicle in accordance with claim 13, wherein the cooling fluid flows in a direction opposite a traveling direction of the vehicle.

* * * * *